United States Patent [19]
Pedemonte et al.

[11] Patent Number: 5,409,916
[45] Date of Patent: Apr. 25, 1995

[54] FIBER REACTIVE ANTHRAQUINONE DYES

[75] Inventors: Ronald P. Pedemonte, Coventry; Thomas S. Phillips, North Providence, both of R.I.

[73] Assignee: Hoechst Celanese Corporation, Somerville, N.J.

[21] Appl. No.: 77,226

[22] Filed: Jun. 14, 1993

[51] Int. Cl.⁶ .................. C07D 251/52; C07D 251/70
[52] U.S. Cl. ..................................................... 544/189
[58] Field of Search .......................................... 544/189

[56] References Cited

U.S. PATENT DOCUMENTS 5,112,971  5/1992  Akahori et al. ............... 544/189
5,227,475  7/1993  Buch et al. ..................... 534/629

Primary Examiner—John M. Ford
Attorney, Agent, or Firm—Hugh C. Crall

[57] ABSTRACT

Fiber reactive dyes of the anthraquinone type which provide brilliant violet colors without metal complexing. These dyes may be represented by the formula:

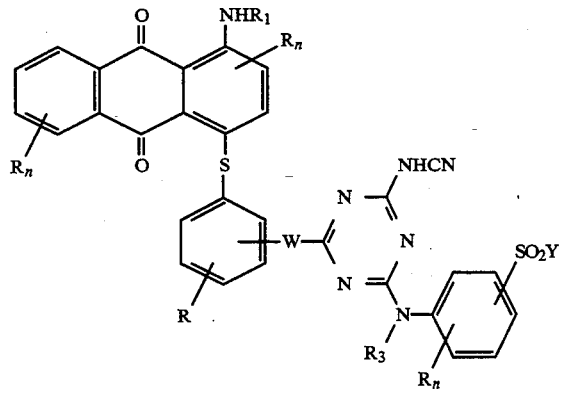

wherein

W is selected from $NR_2$ and oxygen;

R is independently selected from hydrogen, $C_1$–$C_6$ alkyl;

$C_1$–$C_6$ alkoxy, sulfo and carboxy;

$R_1$ is selected from hydrogen, $C_1$–$C_6$ alkyl and phenyl;

$R_2$ is selected from hydrogen and $C_1$–$C_6$ alkyl;

$R_3$ is selected from hydrogen, and $C_1$–$C_4$ alkyl;

n is an integer of 1 or 2; and

Y is $CH=CH_2$, or $CH_2 CH_2 Z$ wherein Z is a group capable of being split off by the action of an alkali reagent.

10 Claims, No Drawings

FIBER REACTIVE ANTHRAQUINONE DYES

BACKGROUND OF THE INVENTION

1. Technical Field

This invention relates to the field of anthraquinone, fiber-reactive dyes.

2. Background

The present invention is directed to water-soluble, fiber-reactive anthraquinone dyes. The class of anthraquinone dyes is well known in the art. As a class, such dyes are generally considered to possess excellent fastness properties. However, as a class they suffer from the disadvantage of high raw material cost. It is therefore important in the industrial dyeing and printing of substrates for a dye to provide superior dye properties, and superior processing characteristics at a competitive cost.

U.S. Pat. No. 5,112,971 represents an attempt to produce improved anthraquinone dyes having fiber reactive moieties useful in dyeing or printing substrates containing hydroxyl and/or amide groups. The dyes of this prior art reference may be represented by the following formula:

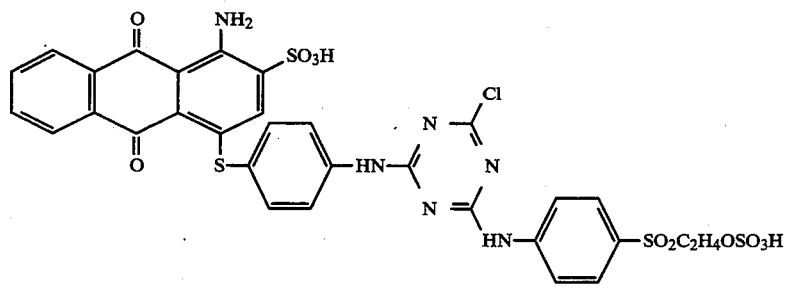

The dyes of this invention provide dyed or printed substrates with excellent fastness properties. In addition, the dyes of the invention provide unexpectedly superior color yield and may be effectively employed in dyeing processes at low dye bath salt concentrations. This property of providing high color yield at low dye bath salt concentrations is an important advantage in that lower raw material costs are achieved at lower waste water purification costs. In addition, the use of less salt in the dyeing process is an important environmental advantage. A second environmental advantage is that the dyes of the invention provide brilliant violet shades without metal complexing the dye; i.e. they are free of heavy metals.

SUMMARY OF THE INVENTION

This invention is that of a new fiber reactive dyes of the formula:

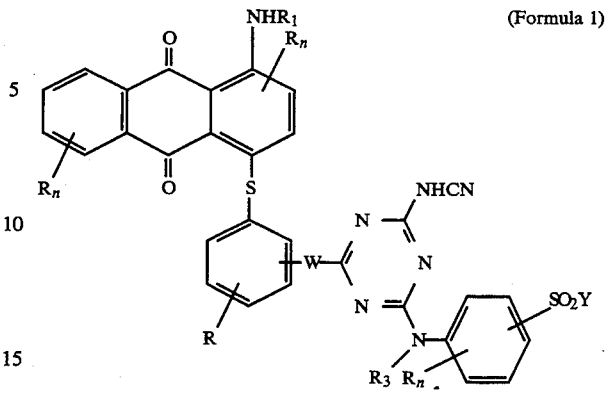

(Formula 1)

wherein

W is selected from $NR_2$ and oxygen;

R is independently selected from hydrogen, $C_1$–$C_6$ alkyl;

$C_1$–$C_6$ alkoxy, sulfo and carboxy;

$R_1$ is selected from hydrogen, $C_1$–$C_6$ alkyl and phenyl;

$R_2$ is selected from hydrogen and $C_1$–$C_6$ alkyl;

$R_3$ is selected from hydrogen, and $C_1$–$C_4$ alkyl;

n is an integer of 1 or 2; and

Y is $CH=CH_2$, or $CH_2 CH_2 Z$ wherein Z is a group capable of being split off by the action of an alkali reagent.

The dyes of the invention are free of heavy metals. They provide dyeings and prints in brilliant violet shades having excellent fastness properties and unexpectedly high color yield in the dyeing process at low dye bath salt concentrations. The dyes of the invention may be applied by methods well known in the art for dyeing and printing textiles and other substrates.

DESCRIPTION OF THE PREFERRED EMBODIMENTS

The fiber reactive, water soluble dyes of this invention are anthraquinone dyes which may be represented by the following general formula:

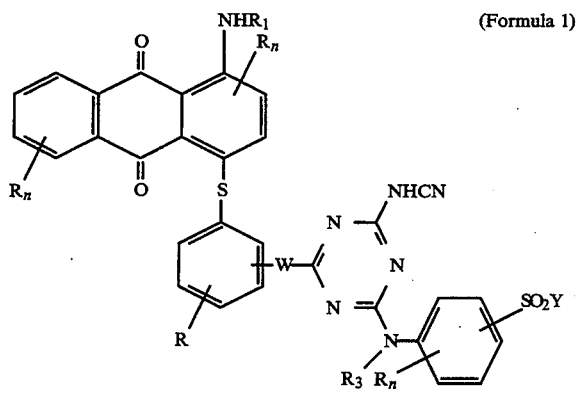

(Formula 1)

R, n, R₁, R₂, W and Y in the above Formula 1 are defined as follows:

R is independently selected from hydrogen, $C_1$ to $C_6$ alkyl, $C_1$ to $C_6$ alkoxy, sulfo and carboxy; preferably R is independently selected from sulfo and carboxy;

n is independently an integer of 1 or 2;

W is selected from $NR_2$ and oxygen;

$R_1$ is selected from hydrogen, $C_1$-$C_6$ alkyl and phenyl;

$R_2$ is selected from hydrogen and $C_1$ to $C_6$ alkyl; preferably $R_2$ is hydrogen or $C_1$ to $C_4$ alkyl; most preferably $R_2$ is hydrogen;

$R_3$ is selected from hydrogen, and $C_1$-$C_4$ alkyl; and

Y represents a fiber reactive group which is selected from $CH=CH_2$ and $CH_2CH_2$—Z wherein Z represents an organic or inorganic moiety which may be split off by treatment with an alkali reagent. Z is preferably selected from —Cl, —Br, —OSO₃H, —SSO₃H, —O-PO₃H₂; most preferably Z is the sulfato group.

The anthraquinone dyes of the invention may be prepared by methods known in the art; see for example U.S. Pat. No. 5,112,971 (issued May 12, 1992) which discloses a process for preparing anthraquinone dyes. Anthraquinone compounds of the following general Formula 2 are known as is their methods of preparation. They are the basic raw material for the anthraquinone chromophore.

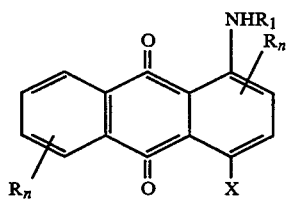

(Formula 2)

wherein R, R₁ and n are as previously defined and X is a leaving group such as halogen (Cl, F, Br, I), nitro, sulfo and the like; preferably X is halogen.

Compounds of Formula 2 are reacted according to Ullmann condensation reaction with a substituted or unsubstituted mercaptoaminobenzene or mercaptophenol of the following formula:

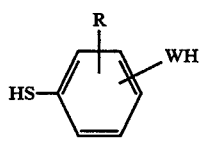

(Formula 3)

wherein W and R are defined above.

Prior to the Ullmann condensation, the amino group may be protected by acylation and after the condensation reaction, the acyl group may be removed by hydrolysis. The resulting condensate may be represented by the following general Formula 4:

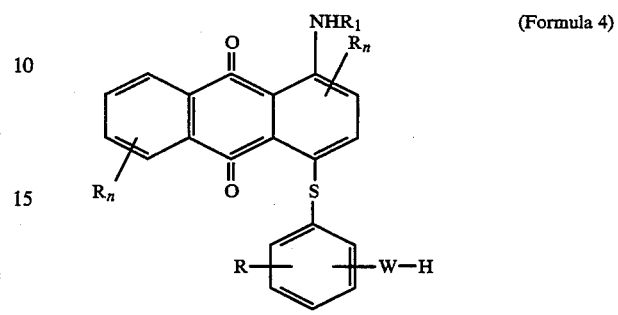

(Formula 4)

The chromophore represented by Formula 4 is condensed with the condensation product of a 2,4,6 trichlorotriazine and cyanamide of the following Formula 5:

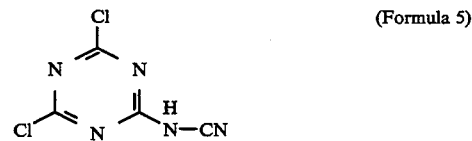

(Formula 5)

The subsequent condensation product of the dichlorotriazine/monocyanamido compound of Formula 5 with the chromophore of Formula 4 may be represented by the following formula (Formula 6):

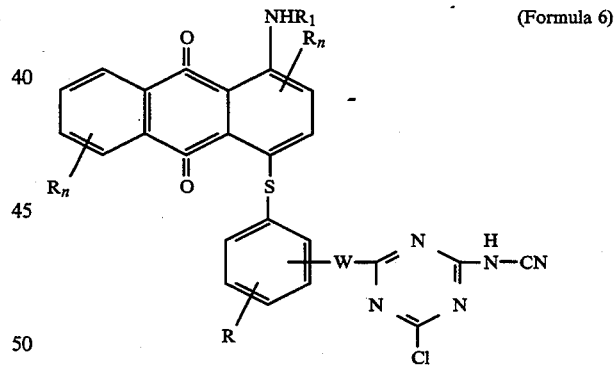

(Formula 6)

This compound of Formula 6 is then condensed with a substituted amine of the following general Formula 7:

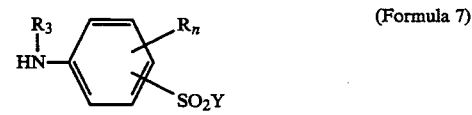

(Formula 7)

wherein Y, R, R₃ and n are defined above.

It will be apparent to the skilled worker that the order of reaction may be modified, for example, the substituted amine of Formula 7 may be reacted with the chlorotriazine monocyanamido compound of Formula 5 and the resulting addition product may be condensed with the compound of Formula 4. In addition, it would be obvious for the skilled worker to first condense the compound of Formula 4 with 2,4,6 trichlorotriazine followed by the sequential addition of cyanamide and then the substituted amine of Formula 5. It will also be apparent to the skilled worker that the reaction mixture may be a mixture of fiber reactive moieties and depending on the reaction conditions e.g. up to 30% of the vinyl moiety and up to about 5% of the non-reactive hydroxy moiety may be formed.

Exemplary compounds of Formula 2 are:
 1-amino-2,4-dibromoanthraquinone:
 1-amino-2-bromo-4-nitroanthraquinone;
 1-cyclohexylamino-4-bromoanthraquinone;
 1-benzoylamino-4-bromoanthraquinone;
 1-isopropylamino-2-carboxy-4-bromoanthraquinone;
 1-cyclohexylamino-4-bromoanthraquinone-5-, 6-, 7- or 8-sulfonic acid;
 1-amino-4-bromoanthraquinone-2-sulfonic acid;
 1-amino-4-bromoanthraquinone-2,6- or 2,7-disulfonic acid;
 1-amino-4-bromoanthraquinone-2,5,8-trisulfonic acid;
 1-methylamino-4-bromoanthraquinone-2-sulfonic acid;
 1-ethylamino-4-bromoanthraquinone-2-sulfonic acid;
 1-propylamino-4-bromoanthraquinone-2-sulfonic acid;
 1-amino-4-bromoanthraquinone-2-carboxylic acid;
 1-amino-4-bromoanthraquinone-2-sulfonic acid-6-carboxylic acid;
 1-amino-4-bromoanthraquinone-2-sulfonic acid-7-carboxylic acid and the like.

Exemplary compounds of Formula 3 compounds are:
 2-aminothiophenol;
 3-aminothiophenol;
 4-aminothiophenol;
 2-hydro xythiophe nol;
 3-hydroxythiophenol;
 4-hydroxythiophenol;
 2-mercapto-5-aminobenzene- 1,4-disulfonic acid;
 5-mercapto-2-amino-4-methylbenzenesulfonic acid;
 2,4,6-trimethyl-3-mercapto-5-aminobenzelesulfonic acid;
 4-mercapto-2-aminobenzenesulfonic acid;
 5-mercapto-2-aminobenzenesulfonic acid;
 2-mercapto-4-aminobenzenesulfonic acid;
 4-mercapto-2-aminobenzoic acid; and
 5-mercapto-2-aminobenzoic acid.

Exemplary compounds of Formula 7 compounds are:
 2-($\beta$-Sulfatoethylsulfonyl)-aniline;
 3-($\beta$-Sulfatoethylsulfonyl)-aniline;
 4-($\beta$-Sulfatoethylsulfonyl)-aniline;
 2-Carboxy-5-($\beta$-sulfatoethylsulfonyl)-aniline;
 2-Chloro-3-($\beta$-Sulfatoethylsulfonyl)-aniline;
 2-Chloro-4-($\beta$-sulfatoethylsulfonyl)-aniline;
 2-Ethoxy-4- or 5-($\beta$-sulfatoett-ylsulfonyl)-aniline;
 2-Ethyl-4-($\beta$-sulfatoethylsulfonyl)-aniline;
 2-Methoxy-5-($\beta$-sulfatoethylsulfonyl)-aniline;
 2,3-Dimethoxy-5-($\beta$-sulfatoethylsulfonyl)-aniline;
 2,4-Dimethoxy-5-($\beta$-sulfatoethylsulfonyl)-aniline;
 2,5-Dimethoxy-4-($\beta$-sulfatoethylsulfonyl)-aniline;
 2-Methoxy-5-methyl-4-($\beta$-sulfatoethylsulfonyl)-aniline;
 2- or 3- or 4-($\beta$-thiosulfatoethylsulfonyl)-aniline;
 2-Methoxy-5-($\beta$-thiosulfatoethylsulfonyl)-aniline;
 2-Sulfo-4-($\beta$phosphatoethylsulfonyl)-aniline;
 2-Sulfo-4-vinylsulfonyl-aniline;
 2-Hydroxy-4- or 5-($\beta$-sulfatoethylsulfonyl)-aniline;
 2-Chloro-4- or -5-($\beta$-chloroethylsulfonyl)aniline;
 3,4-Di-($\beta$-sulfatoethylsulfonyl)-aniline;
 2,5-Di($\beta$-sulfatoethylsulfonyl)-aniline;
 2,5-Bis-[($\beta$-sulfatoethylsulfonyl)-methyl] aniline;
 N-Methyl-N-[4-($\beta$-sulfatoethylsulfonyl)] aniline;
 N-Methyl-N-[3-($\beta$-sulfatoethylsulfonyl)] aniline;
 N-Ethyl-N-[4-($\beta$-sulfatoethylsulfonyl)] aniline; and
 N-Ethyl-N-[3-($\beta$-sulfatoethylsulfonyl)] aniline.

After preparation, the dyes may be isolated as a powder, either by salting out of solution or by spray drying, and brought to standard strength by the addition of inorganic salt, generally sodium sulfate. Advantageously, the prepared dyestuff may be used directly as a liquid composition after standardizing with water. Such liquid compositions will contain from 5 to 45% (by weight) of the dyes of the invention.

The dyes of the invention in this description are shown in their free acid form. They may be employed in their free acid form or as salts of the acid. Preferably, they are used in their salt form and in particular as the alkali metal and alkaline earth metal salts; e.g. as sodium, potassium, lithium and the like.

The dyes of the invention may be employed to dye materials such as cotton, linen, viscose, rayon, wool, silk and synthetic polyamides by methods well known in the art e.g. exhaust dyeing methods such beck, jet, and package dyeing or continuous pad dyeing techniques.

The following examples illustrate the invention but are not intended to limit its scope unless otherwise specified.. In the examples and the claims, percentages and parts are by weight and temperatures are °C. Examples 1 and 4 illustrate the prior art while the other examples illustrate the invention.

Example 1 (Prior Art)

8.9 pans of 1-aminobenzene-4-(2-sulfatoethyl)sulfone and 5.5 parts of cyanuric chloride were condensed at 10°–15° C. in an aqueous medium of pH 3–4. The product was condensed with 12.8 parts of 1-amino-4-[(4-aminophenyl)thio]-9,10-dihydro-9,10-dioxo-2-anthracenesulfonic acid at 20°–40° C. at a pH between 4.5 and 5.0. The product was isolated by salting out with 27.5 parts of NaCl to afford 26 pans of a bluish-violet dye having an absorbance of 0.310 at a lambda max of 549 nm and an assay of 77% (area) by high pressure liquid chromatography (HPLC). This compound has the following formula:

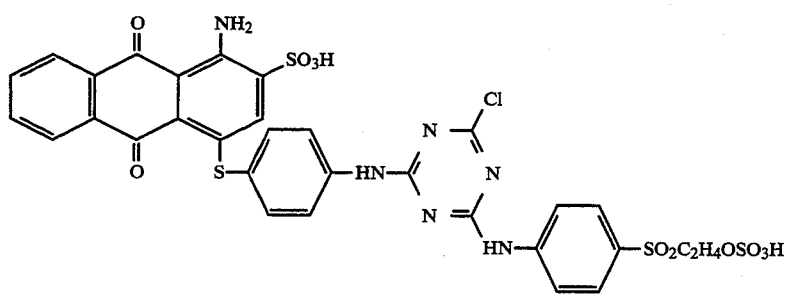

Example 2 (Invention)

1.3 parts of cyanamide and 5.5 parts of cyanuric chloride were condensed at 0°–5° C. in an aqueous medium of pH 8.5–9.5. The product was condensed with 12.8 pans of 1-amino-4-[(4-aminophenyl)thio]-9,10-dihydro-9,10-dioxo-2-anthracenesulfonic acid at 20°–40° C. at a pH between 8.5 and 9.0. This product was then condensed with 8.4 parts of 1-aminobenzene-4-(2-sulfatoethyl)-sulfone at 70°–80° C. at a pH of 3.5–4.0. The product was isolated by salting out with 15 pads of NaCl to afford 28 parts of a bluish-violet dye having an absorbance of 0.310 at a lambda max of 551 nm and an assay of 70% (area) by HPLC. This compound has the following formula:

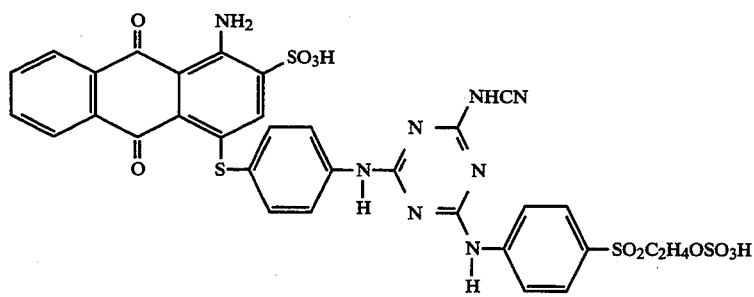

Example 3 (Invention)

This compound was prepared by the procedure described for Example 2, except that 1-aminobenzene-3-(2-sulfatoethyl)sulfone replaced 1-aminobenzene-4-(2-sulfatoethyl)sulfone in the final condensation. The product was a bluish-violet dye having an absorbance of 0.380 at a lambda max of 545 nm and an assay of 80% (area) by HPLC. This compound has the following formula:

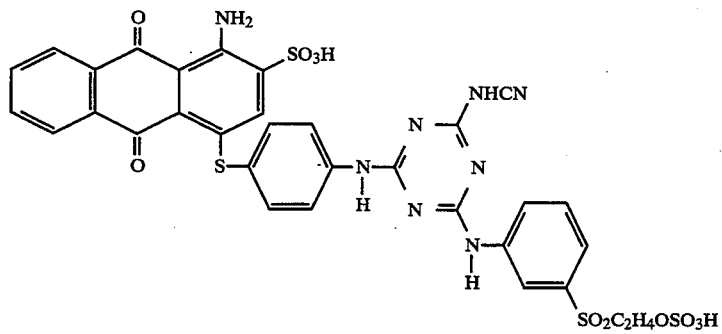

Example 4 (Prior Art)

This compound was prepared by the procedure described for Example 1, except that 1-amino-4-[(2-aminophenyl)thio]-9,10-dihydro-9,10-dioxo-2-anthracenesulfonic acid replaced 1-amino-4-[(4-aminophenyl)thio]-9,10-dihydro-9,10-dioxo-2-anthracenesulfonic acid. The product was a red-violet dye having an absorbance of 0.250 at a lambda max of 542 nm and an assay of 79% (area) by HPLC. This compound has the following formula:

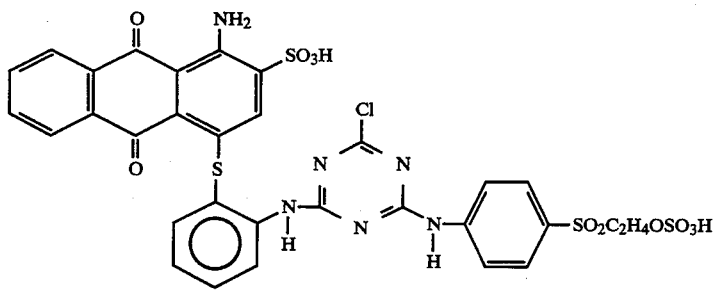

Example 5 (Invention)

This product was prepared by the procedure described for Example 2, except that 1-amino-4-[(2-aminophenyl)thio]-9,10-dihydro-9,10-dioxo-2-anthracenesulfonic acid replaced the 1-amino-4-[(4-aminophenyl)thio]-9,10-dihydro-9,10-dioxo-2-anthracenesulfonic acid in the second condensation. The product was a red-violet dye having an absorbance of 0.220 at a lambda max of 539 nm and an assay of 76% (area) by HPLC. This compound has the following formula:

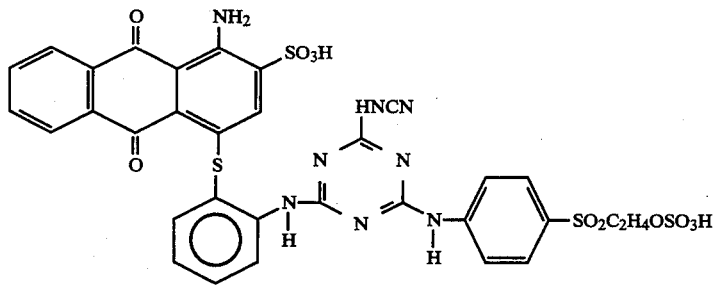

Example 6 (Invention)

This compound was prepared by the procedure described for Example 2, except that 1-amino-4-[(2-aminophenyl)thio]-9,10-dihydro-9,10-dioxo-2-anthracenesulfonic acid replaced the 1-amino-4-[(4-aminophenyl)thio]-9,10-dihydro-9,10-dioxo-2-anthracenesulfonic acid in the second condensation and 1-aminobenzene-3-(2-sulfatoethyl)-sulfone replaced the 1-aminobenzene-4-(2-sulfatoethyl)sulfone in the final condensation. The product was a red-violet dye having an absorbance of 0.250 at a lambda max of 539 nm and an assay of 80% (area) by HPLC. This compound has the following formula:

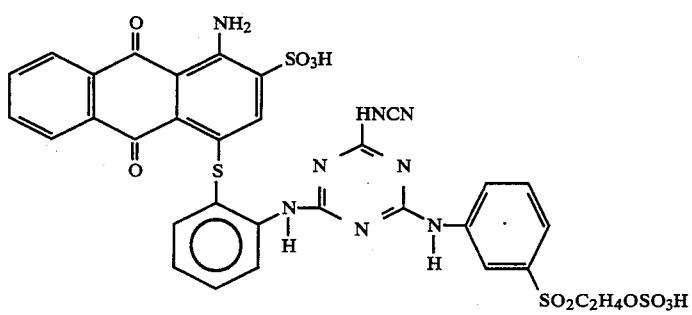

Example 7 (Invention)

This product was prepared by the procedure described for Example 2, except that 1-amino-4-[(4-hydroxyphenyl)thio]-9,10-dihydro-9,10-dioxo-2-anthracenesulfonic replaced the 1-amino-4-[(4-aminophenyl)-thio]-9,10-dihydro-9,10-dioxo-2-anthracenesulfonic acid in the second condensation. The product was a blue-violet dye having an absorbance of 0.34 at a λ max of 545 n. This compound has the following formula:

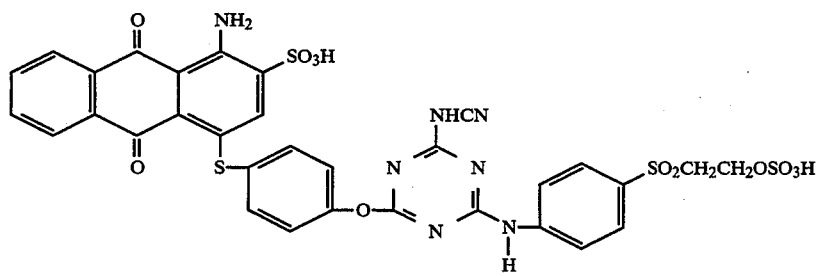
Similar dyes may be prepared using the foregoing procedures. These dyes have the following general formula and are illustrated below:
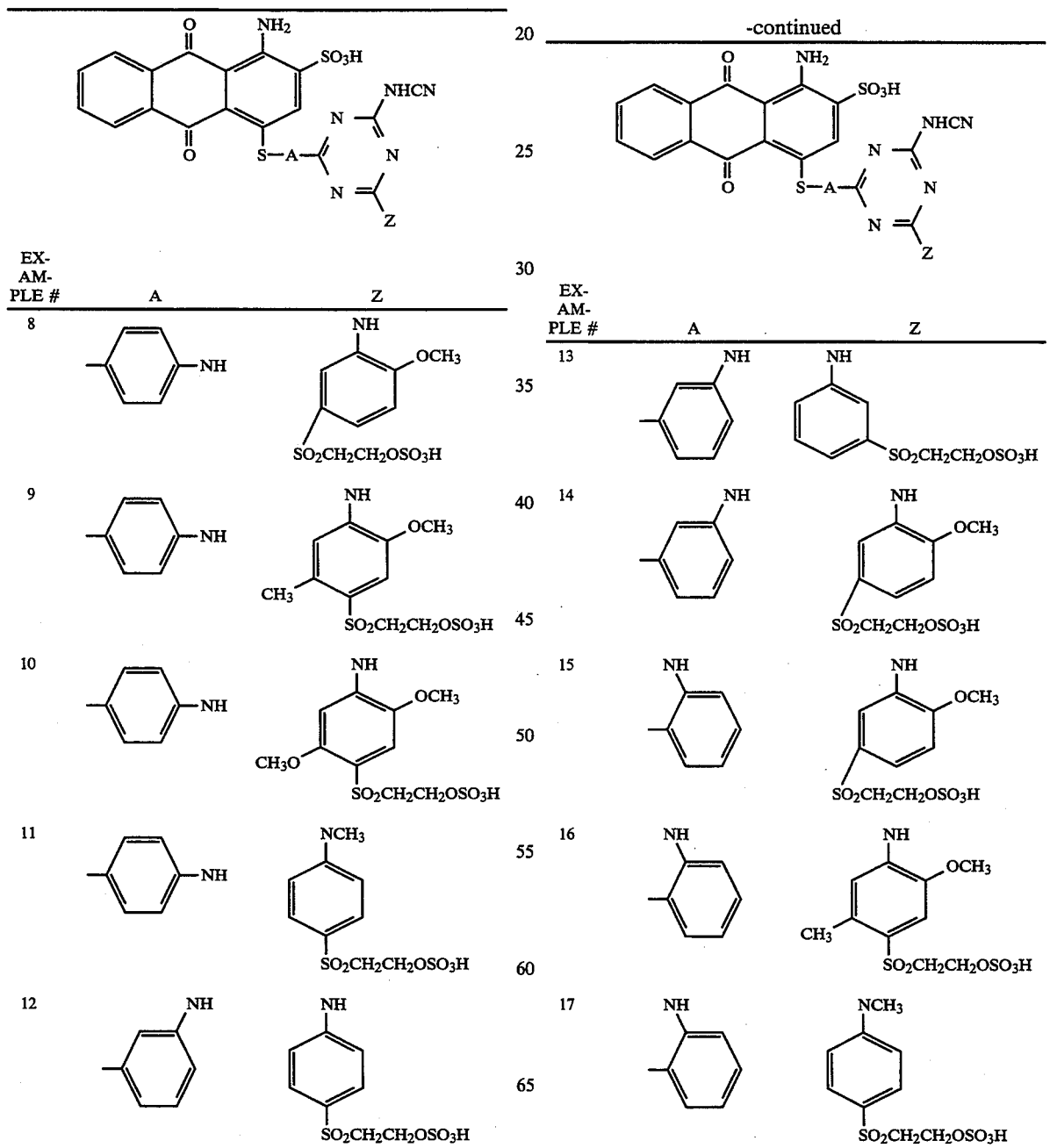

| EXAMPLE # | A | Z |
|---|---|---|
| 18 | -C6H4-O- (para) | -NH-C6H4-SO2CH2CH2OSO3H (para) |
| 19 | -C6H4-O- (para) | -NH-C6H3(OCH3)-SO2CH2CH2OSO3H |
| 20 | -C6H4-O- (para) | -N(CH3)-C6H4-SO2CH2CH2OSO3H |
| 21 | -C6H4-O- (para) | -NH-C6H2(OCH3)(CH3)-SO2CH2CH2OSO3H |
| 22 | -C6H3(SO3H)-NH- | -NH-C6H4-SO2CH2CH2OSO3H |
| 23 | -C6H3(SO3H)-NH- | -NH-C6H4-SO2CH2CH2OSO3H (meta) |
| 24 | -C6H3(SO3H)-NH- | -NH-C6H3(OCH3)-SO2CH2CH2OSO3H |
| 25 | -C6H3(SO3H)-NH- | -N(CH3)-C6H4-SO2CH2CH2OSO3H |
| 26 | -C6H3(SO3H)-NH- | -NH-C6H4-SO2CH2CH2OSO3H |
| 27 | -C6H3(SO3H)-NH- | -NH-C6H4-SO2CH2CH2OSO3H (meta) |
| 28 | -C6H3(SO3H)-NH- | -NH-C6H3(OCH3)-SO2CH2CH2OSO3H |
| 29 | -C6H3(SO3H)-NH- | -NH-C6H2(OCH3)(CH3)-SO2CH2CH2OSO3H |
| 30 | -C6H3(SO3H)-NH- | -N(CH3)-C6H4-SO2CH2CH2OSO3H |

Additional dyes may be prepared using the foregoing procedures. These dyes have the following general formula and are illustrated below:

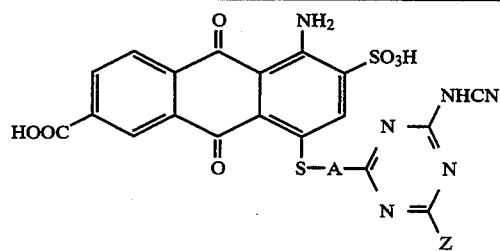
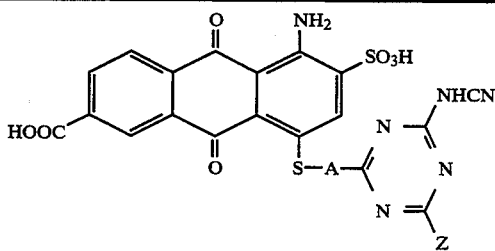

| EXAMPLE # | A | Z |
|---|---|---|
| 31 | 4-C6H4-NH | 2-NH,1-OCH3,4-SO2CH2CH2OSO3H-phenyl |
| 32 | 4-C6H4-NH | 4-NH,5-OCH3,2-CH3,1-SO2CH2CH2OSO3H-phenyl |
| 33 | 4-C6H4-NH | 4-NH,5-OCH3,2-OCH3,1-SO2CH2CH2OSO3H-phenyl |
| 34 | 4-C6H4-NH | 4-NCH3,1-SO2CH2CH2OSO3H-phenyl |
| 35 | 3-C6H4-NH | 4-NH,1-SO2CH2CH2OSO3H-phenyl |
| 36 | 3-C6H4-NH | 3-NH,1-SO2CH2CH2OSO3H-phenyl |
| 37 | 3-C6H4-NH | 2-NH,1-OCH3,4-SO2CH2CH2OSO3H-phenyl |

| EXAMPLE # | A | Z |
|---|---|---|
| 38 | 2-C6H4-NH | 2-NH,1-OCH3,4-SO2CH2CH2OSO3H-phenyl |
| 39 | 2-C6H4-NH | 4-NH,5-OCH3,2-CH3,1-SO2CH2CH2OSO3H-phenyl |
| 40 | 2-C6H4-NH | 4-NCH3,1-SO2CH2CH2OSO3H-phenyl |
| 41 | 4-C6H4-O | 4-NH,1-SO2CH2CH2OSO3H-phenyl |
| 42 | 4-C6H4-O | 2-NH,1-OCH3,4-SO2CH2CH2OSO3H-phenyl |
| 43 | 4-C6H4-O | 4-NCH3,1-SO2CH2CH2OSO3H-phenyl |
| 44 | 4-C6H4-O | 4-NH,5-OCH3,2-CH3,1-SO2CH2CH2OSO3H-phenyl |

-continued
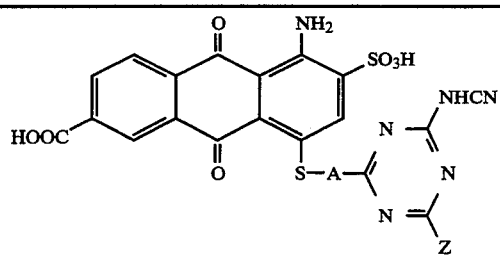
| EXAMPLE # | A | Z |
|---|---|---|
| 45 | 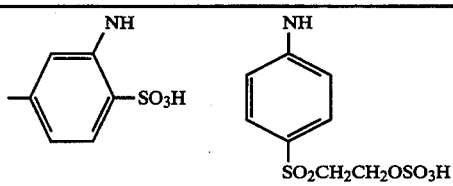 | |
| 46 | 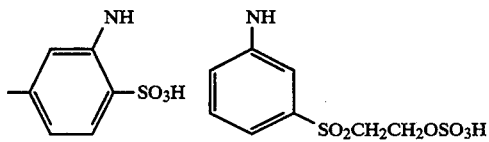 | |
| 47 | 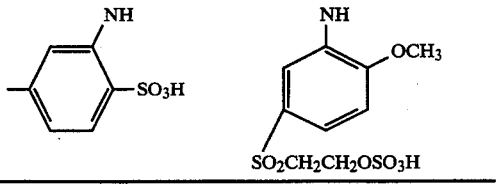 | |
Similarly, dyes may be prepared using the foregoing procedures. These dyes have the following general formula and are illustrated below:
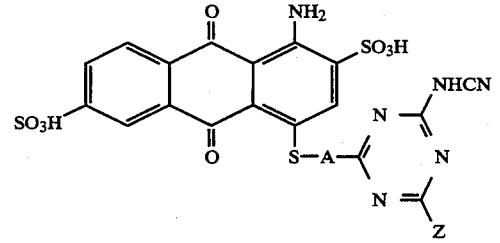
| EXAMPLE # | A | Z |
|---|---|---|
| 48 | 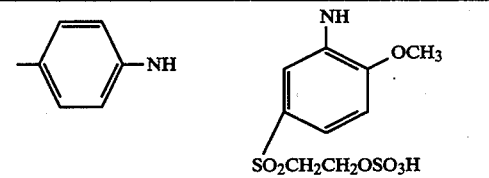 | |
| 49 | 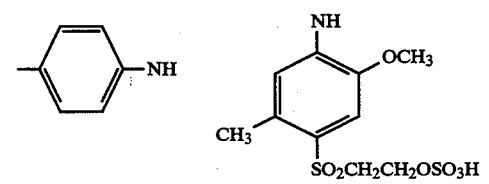 | |
-continued
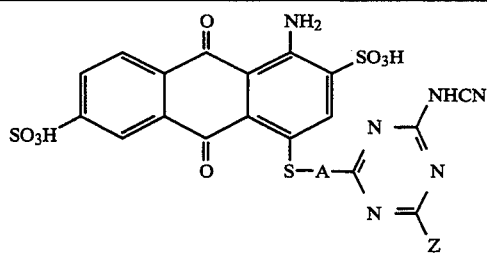
| EXAMPLE # | A | Z |
|---|---|---|
| 50 | 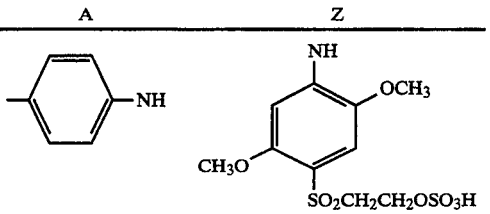 | |
| 51 | | |
| 52 | 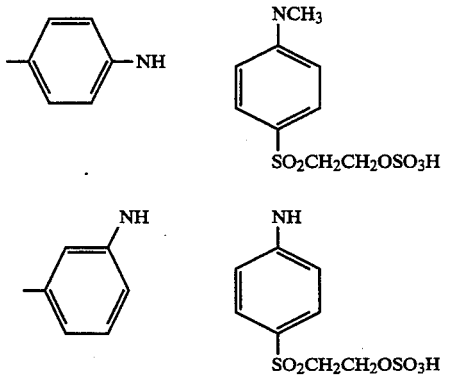 | |
| 53 | | |
| 54 | 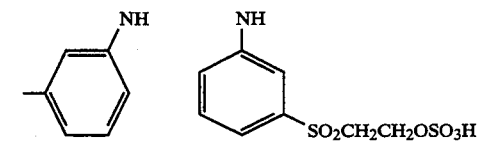 | |
| 55 | 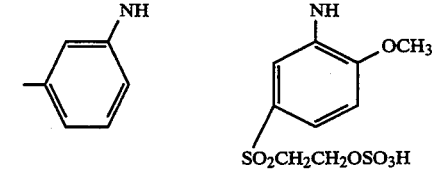 | |
| 56 | 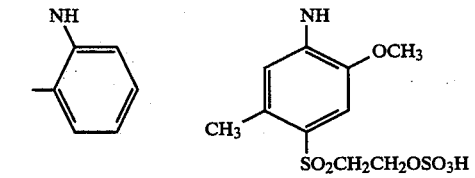 | |

-continued

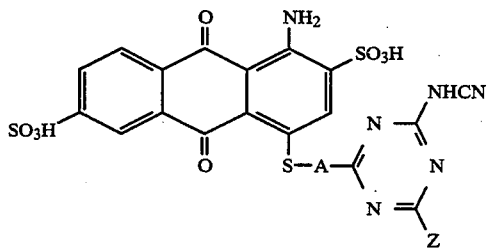

| EXAMPLE # | A | Z |
|---|---|---|
| 57 | 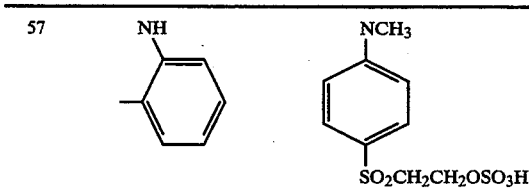 | |
| 58 | 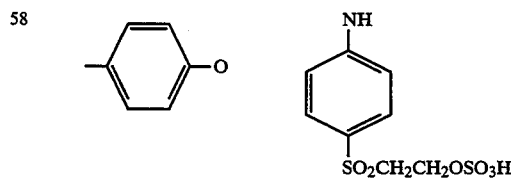 | |
| 59 | 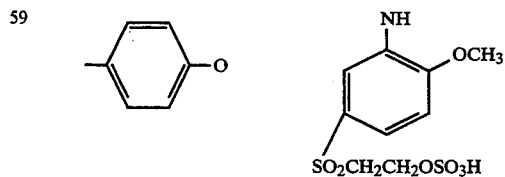 | |
| 60 | 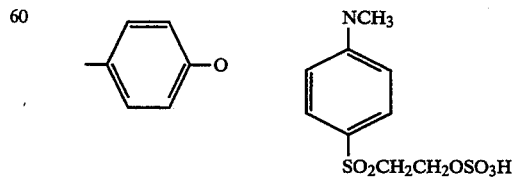 | |
| 61 | 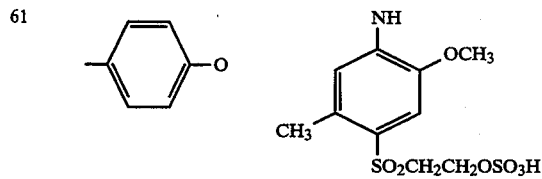 | |
| 62 | 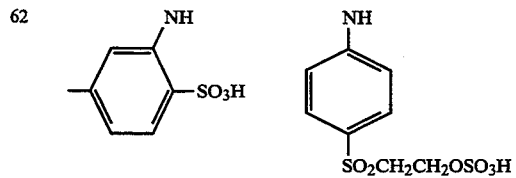 | |
| 63 | 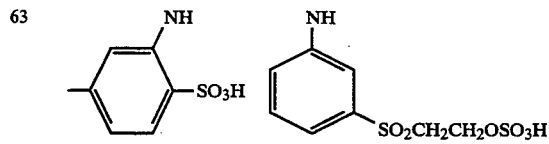 | |

-continued

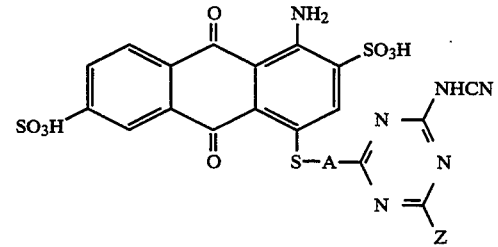

| EXAMPLE # | A | Z |
|---|---|---|
| 64 | 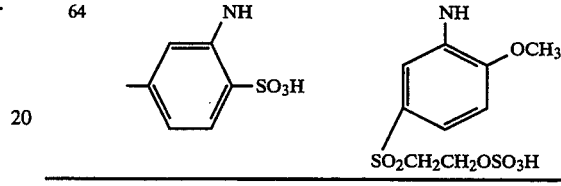 | |

The dyes of the invention were evaluated by exhaust dyeing cotton test specimens. Exhaust dyeing is well known in the art. Two sets of dyeing were made for each dye. One dyeing was conducted at the normal dyebath salt concentration and the second dyeing was conducted at a reduced salt dyebath concentration. The color yield of each dyeing was evaluated by a computer assisted spectrophotometric method known in the art. The color yield is expressed in color density units (CDU's). The results of these tests are listed in Tables 1–4 which follow. In the following description the term, "Standard Salt" means a salt concentration between 50 to 100 grams per liter of dye bath solution and a salt concentration between 10 to 25 grams per liter of dye bath solution. The ratio of salt to dye is dependent on the dye concentration employed in the dye i.e. the higher the dye concentration, the higher the salt concentration.

TABLE I

Standard Salt
(Color Yield in CDU's)

| % Dye | gm/l NaCl | Example 1 | Example 2 | Example 3 |
|---|---|---|---|---|
| .20 | 50 | 0.0810 | 0.0913 | 0.1241 |
| .50 | 50 | 0.1178 | 0.1763 | 0.2279 |
| 1.0 | 80 | 0.1005 | 0.3866 | 0.4293 |
| 2.0 | 80 | 0.1279 | 0.5388 | 0.7201 |
| 4.0 | 100 | 0.1042 | 0.6386 | 0.9352 |
| 6.0 | 100 | 0.1114 | 0.7600 | 1.0876 |

TABLE II

Reduced Salt
(Color Yield in CDU'S)

| % Dye | gm/l NaCl | Example 1 | Example 2 | Example 3 |
|---|---|---|---|---|
| .20 | 10 | 0.0895 | 0.0974 | 0.1112 |
| .50 | 20 | 0.1239 | 0.1833 | 0.2226 |
| 1.0 | 25 | 0.1995 | 0.3621 | 0.4297 |
| 2.0 | 25 | 0.2609 | 0.5945 | 0.6850 |
| 4.0 | 25 | 0.3456 | 1.0479 | 1.1045 |
| 6.0 | 25 | 0.3920 | 1.3678 | 1.3464 |

TABLE III

| | | Standard Salt (Color Yield in CDU'S) | | |
|---|---|---|---|---|
| % Dye | gm/l NaCl | Example 4 | Example 5 | Example 6 |
| .20 | 50 | 0.0378 | 0.0633 | 0.0692 |
| .50 | 50 | 0.0550 | 0.1127 | 0.1270 |
| 1.0 | 80 | 0.0826 | 0.2328 | 0.2463 |
| 2.0 | 80 | 0.1115 | 0.3558 | 0.4049 |
| 4.0 | 100 | 0.1297 | 0.6263 | 0.6818 |
| 6.0 | 100 | 0.1397 | 0.8789 | 0.8616 |

TABLE IV

| | | Reduced Salt (Color Yield in CDU'S) | | |
|---|---|---|---|---|
| % Dye | gm/l NaCl | Example 4 | Example 5 | Example 6 |
| .20 | 10 | 0.0536 | 0.0543 | 0.0571 |
| .50 | 20 | 0.1109 | 0.1005 | 0.1194 |
| 1.0 | 25 | 0.2055 | 0.2233 | 0.2345 |
| 2.0 | 25 | 0.2890 | 0.3559 | 0.3586 |
| 4.0 | 25 | 0.4267 | 0.6330 | 0.6096 |
| 6.0 | 25 | 0.4813 | 0.7976 | 0.7395 |

The results set forth in Tables 1-4 show that at 1-6% dye concentration, the dyes of the invention produces a color yield approximately 5-10 times higher than the color yield of the prior art dyes. At reduced dyebath salt concentrations, the dyes of the invention produce a color yield essentially equivalent or better than dyeings at the standard salt concentration and are approximately two to four times higher in color yield than that of the prior art dyes.

The invention may be embodied in other specific forms without departing from the spirit or essential characteristics thereof. Through this specification and the appended claims, a given chemical name or formula is intended to encompass all isomers of said name or formula where such isomers exist. The present embodiments are therefore to be considered in all respects as illustrative and not restrictive, the scope of the invention being indicated by the appended claims rather than by the foregoing description; and all changes which come within the meaning and equivalency of the claims are therefore intended to be embraced therein.

We claim:
1. A compound of the formula:

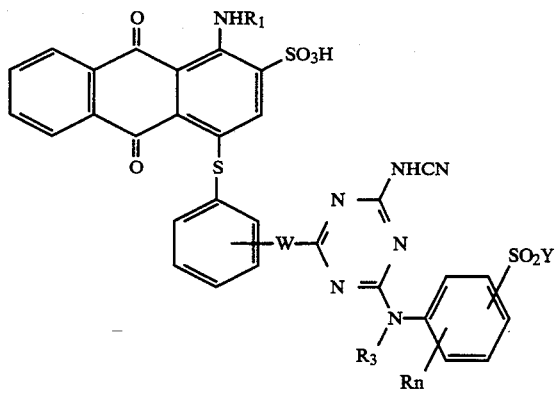

wherein:
R is independently selected from hydrogen, $C_1$ to $C_6$ alkyl, $C_1$ to $C_6$ alkoxy;
n is independently an integer of 1 or 2;
W is selected from $NR_2$ and oxygen;
$R_1$ is selected from hydrogen, $C_1$-$C_6$ alkyl and phenyl;
$R_2$ is selected from hydrogen and $C_1$ to $C_6$ alkyl;
$R_3$ is selected from hydrogen and, $C_1$-$C_4$ alkyl; and
Y is selected from $CH=CH_2$ and $CH_2CH_2Z$ wherein Z is selected from —Cl, —Br, —$OSO_3H$, —$SSO_3H$, —$OPO_3H_2$ and the metal salts thereof.

2. A compound according to claim 1 wherein W is $NR_2$.

3. A compound according to claim 1 wherein W is oxygen.

4. A compound according to claim 2 wherein R is selected from hydrogen, and Z is $OSO_3H$ and the metal salts thereof.

5. A compound according to claim 3 wherein R is selected from hydrogen, and Z is $OSO_3H$ and the metal salts thereof.

6. A compound according to claim 4 of the formula:

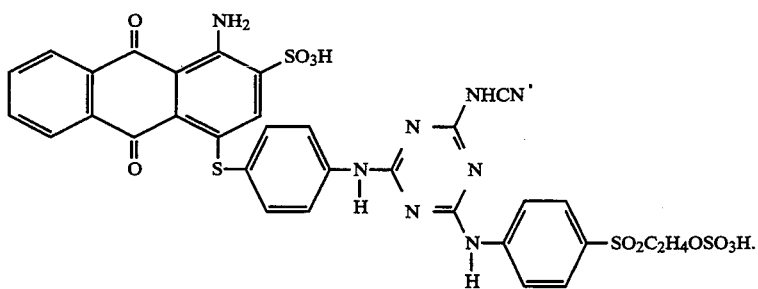

7. A compound according to claim 4 of the formula:

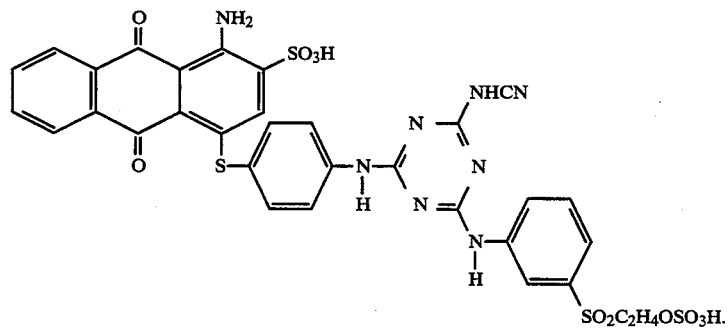
8. A compound according to claim 4 of the formula:
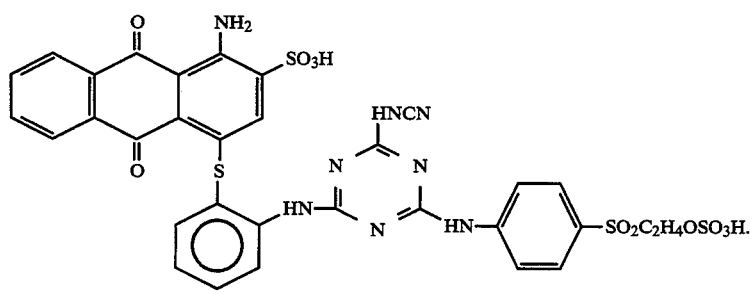
9. A compound according to claim 4 of the formula:
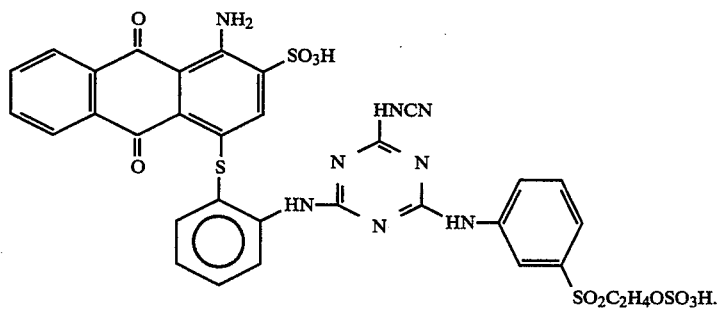
10. A compound according to claim 5 of the formula:
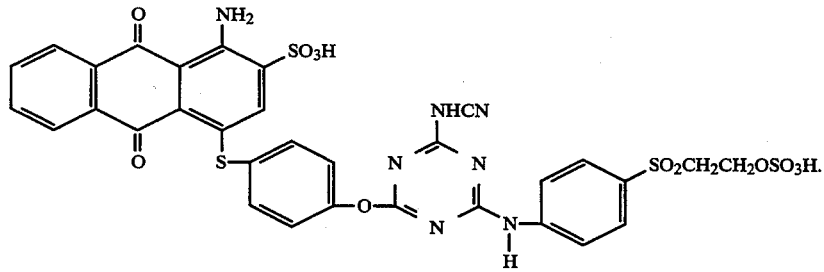
* * * * *

UNITED STATES PATENT AND TRADEMARK OFFICE
CERTIFICATE OF CORRECTION

PATENT NO. : 5,409,916
DATED : April 25, 1995
INVENTOR(S) : Ronald P. Pedemonte et al It is certified that error appears in the above—identified patent and that said Letters Patent is hereby corrected as shown below:

Column 6, Line 55, -- pans -- should read -- parts --

Column 6, Line 63, -- pans -- should read -- parts --

Column 7, Line 21, -- pans -- should read -- parts --

Column 7, Line 44, -- pads -- should read -- parts --

Column 20, Line 27, -- eacln -- should read -- each --

Column 20, Line 32, -- spectroptnotometric -- should read -- spectrophotometric --

Column 21, Line 37, -- ernbodiments -- should read -- embodiments --

Signed and Sealed this

Twenty-seventh Day of June, 1995

Attest:

BRUCE LEHMAN

Attesting Officer    Commissioner of Patents and Trademarks